United States Patent Office 3,493,543
Patented Feb. 3, 1970

3,493,543
POLYUREA COMPOSITIONS AND THE COATING OF SUBSTRATES WITH SUCH COMPOSITIONS
John R. Nazy and Kenneth B. Stokes, Minneapolis, Minn., assignors to General Mills, Inc., a corporation of Delaware
No Drawing. Filed Mar. 20, 1967, Ser. No. 624,131
Int. Cl. C08g 22/02
U.S. Cl. 260—77.5        12 Claims

ABSTRACT OF THE DISCLOSURE

A polyurea polymer prepared from a triisocyanate of the structural formula:

$$OCN-R_4-N-\underset{\underset{NH-R_4-NCO}{\overset{C=O}{|}}}{\overset{O}{\overset{\|}{C}}}-NH-R_4-NCO$$

or a mixture thereof with a diisocyanate of the structural formula:

$$OCN-(CH_2)_y-R_3-(CH_2)_y-NCO$$

and a derivative of the structural formula:

$$\begin{array}{c}R_1\\ \diagdown\\ R_2\diagup\end{array}C=N-R\diagdown\begin{array}{c}O\;H\\ \|\;|\\ N-C-N-(CH_2)_y-R_3-(CH_2)_y-N-C-N\\ |\;\|\\ H\;O\end{array}\diagup\begin{array}{c}R-N=C\diagup R_1\\ \diagdown R_2\\ R-N=C\diagup R_1\\ \diagdown R_2\end{array}$$

where R is an alkylene group of 2 to 6 carbon atoms, $R_1$ and $R_2$ are hydrogen or organic radicals, $R_3$ is the 30 to 42 carbon atom divalent hydrocarbon radical of dimerized ethylenically unsaturated aliphatic monobasic carboxylic acids of 16 to 22 carbon atoms, $R_4$ is a divalent hydrocarbon group of 2 to 10 carbon atoms and $y$ is 0 or 1.

---

The present invention relates to novel polyurea compositions. It also relates to the use of such compositions for coating various substrates.

We have now discovered that polyurea polymers having unique properties can be prepared from certain polyisocyanates or combinations of polyisocyanates and certain derivatives of aldimines or ketimines. The polyurea polymers are particularly valuable as coatings for various substrates.

The derivatives employed in the present invention are prepared from ketimine or aldimine blocked alkylene polyamines containing one free secondary amine group and diisocyanates derived from dimerized fat acids. The alkylene polyamines have the formula:

$$H_2N-R-\underset{H}{N}-R-NH_2$$

where R is an alkylene group of 2–6 carbon atoms, such as ethylene, propylene, butylene, pentamethylene, hexamethylene and the like.

The primary amine groups of the alkylene polyamines are converted to aldimine or ketimine groups by reaction with a carbonyl compound. Such carbonyl compounds have the following structural formula:

$$O=C\diagup^{R_1}_{\diagdown R_2}$$

where $R_1$ and $R_2$ are hydrogen or organic radicals and are each substantially inert to the ketimine or aldimine formation reaction. At least one of such radicals must be an organic group. Preferably $R_1$ and $R_2$, when organic, are short chain alkyl groups (1 to 4 carbon atoms). Preferred compounds are low molecular weight ($C_2$–$C_6$) aldehydes and ketones that are volatile so that an unreacted excess thereof may easily be removed by conventional distillation practices when the reaction is completed. It is often preferred to use a carbonyl compound which boils below or near the boiling point of water or which readily distills with water.

Preferred examples of the carbonyl compounds include such aldehydes and ketones as acetone, methyl ethyl ketone, diethyl ketone, methyl propyl ketone, methyl isopropyl ketone, methyl isobutyl ketone, methyl n-butyl ketone, ethyl isopropyl ketone, acetaldehyde, propionaldehyde, butyraldehyde, isobutyraldehyde, and the like. Especially preferred carbonyl compounds are acetone, methyl ethyl ketone and methyl isobutyl ketone.

The preparation of the diketimines or dialdimines from the alkylene polyamines and the carbonyl compounds can be carried out by conventional procedures. The reaction is illustrated as follows:

$$H_2N-R-\underset{H}{\overset{H}{N}}-R-NH_2 + 2O=C\diagup^{R_1}_{\diagdown R_2} \xrightarrow{\Delta}$$

$$\overset{R_1}{\underset{R_2}{\diagdown}}C=N-R-\underset{H}{\overset{H}{N}}-R-N=C\diagup^{R_1}_{\diagdown R_2} + 2H_2O \uparrow$$

The water can be removed from the reaction mixture by various methods. Thus the reaction can be carried out in the presence of a water carrier—i.e. a substance which, upon distillation from the reaction mixture, removes water therefrom generally in the form of a constant boiling azeotrope. Suitable water-removing agents are isopropanol, isobutanol, hexane, octane, benzene, toluene, cyclohexane, methylcyclohexane and the like. See U.S. Patent 2,416,042. Various of the diketimine compounds are commercially available.

The derivatives are then prepared by reacting the described diketimine or dialdimine compounds with a diisocyanate derived from dimerized fat acids. Such diisocyanates have the following structural formula:

$$OCN-(CH_2)_y-R_3-(CH_2)_y-NCO$$

where $y$ is 0 or 1 and $R_3$ is the divalent hydrocarbon group of dimerized fat acids of 32 to 44 carbon atoms. The diisocyanates of the above formula wherein $y$ is 0 are prepared by converting the dimeric fat acids to the corresponding dimeric acid chlorides, reacting the acid chlorides with a metal azide to form the dimeric acyl azide and then heating the acyl azides to produce the diisocyanates. This method of preparation can be conveniently illustrated by the following equations:

$$3HOOC-R_3-COOH + 2PCl_3 \longrightarrow 3ClOC-R_3-COCl + 2H_3PO_3$$

$$ClOC-R_3-COCl + 2NaN_3 \longrightarrow N_3OC-R_3-CON_3 + 2NaCl$$

$$N_3OC-R_3-CON_3 \xrightarrow{\Delta} OCN-R_3-NCO + 2N_2$$

The diisocyanates where $y$ is 1 are prepared by converting the dimeric fat acids to the corresponding dinitriles and then hydrogenating the dinitriles in the presence of ammonia and a catalyst such as Raney nickel to form diamines. The diamines are then reacted with phosgene to give the diisocynates. This method of preparation can be conveniently illustrated by the following equations:

$$HOOC-R_3-COOH + 2NH_3 \longrightarrow NC-R_3-CN + 4H_2O$$

$$NC-R_3-CN + 4H_2 \xrightarrow[\text{Catalyst}]{NH_3} H_2NCH_2-R_3-CH_2NH_2$$

$$H_2NCH_2-R_3-CH_2NH_2 + 2COCl_2 \longrightarrow$$
$$OCNCH_2-R_3-CH_2NCO + 4HCl$$

The starting dimerized fat acids are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic) 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization products by vacuum distillation at low pressures, solvent extraction or other known separation procedures. The polymerization product varies somewhat depending on the starting fat acid or mixture thereof and the polymerization technique employed—i.e. thermal, catalytic, particular catalyst, conditions of pressure, temperature, etc. Likewise, the nature of the dimerized acids separated from the polymerization product also depends somewhat on these factors although such acids are functionally similar.

Attempts have been made to fully delineate the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler, in a study relating principally to the thermal polymerization of normal methyl linoleate, stated that at least two main products had been identified by others as resulting from such polymerization:

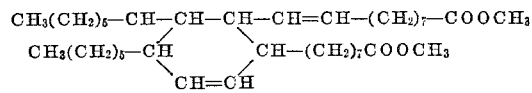

and

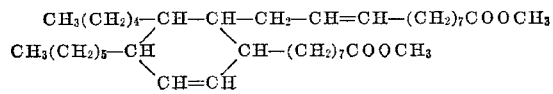

Their experimental work then indicated the latter structure predominated in the thermal polymerization product (The Journal of the American Oil Chemists Society, vol. XXVI, No. 6, June 1949, pages 278–83). Moore theorized (using the Diels-Alder mechanism) that the polymerization of linoleic acid would yield a variety of 36 carbon atom acids of high structural similarity (Paint, Oil & Chemical Review, Jan. 4, 1951, pages 13–15, 26–29). Thus it was generalized that a portion of normal linoleic acid having the structure

(depicted for convenience as R—C=C—C—C=—R') would be conjugated ruring the polymerization to the 9,11 acid:

(depicted for convenience as R—C—C=C—C=C—R') It was then set forth that these acids could polymerize as follows:

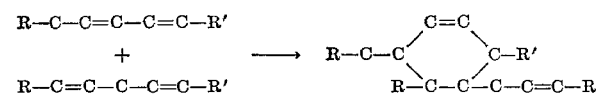

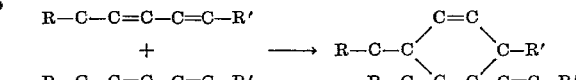

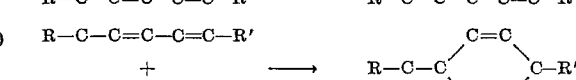

or

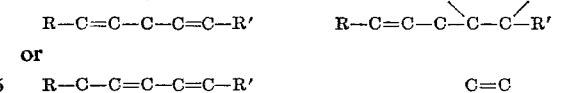

Moore further indicated that the 9,12-linoleic acid could also conjugate to the 10,12 acid and that this acid could self-polymerize or polymerize with the 9,12 or 9,11 acids. It was stated that the polymerizations could be "head-to-tail" as well as "head-to-head" as depicted above. Moore further stated that in many instances octadecatrienoic acids are present in many of the naturally occurring raw materials rich in octadecadienoic acids and that the self-polymerization of said acid could be depicted as follows:

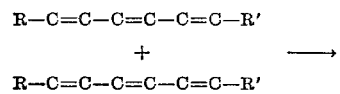

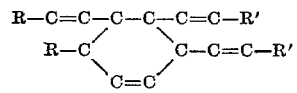

However, the author stated that such a product had not been isolated and that a second reaction probably takes place which could yield a diacid of the structure

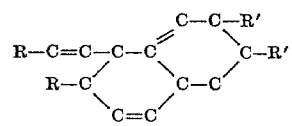

Ault et al. gave a possible structure for the dimer of methyl α-eleostearate, an ester of an octadecatrienoic acid, as follows:

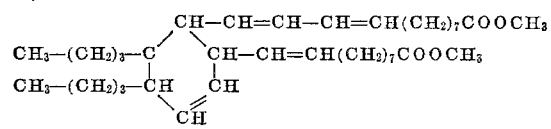

However, they also postulated that the structure could in fact be more complicated. Thus it was postulated that further cyclic rings were formed due to the high unsaturation giving a compound having the following proposed structure:

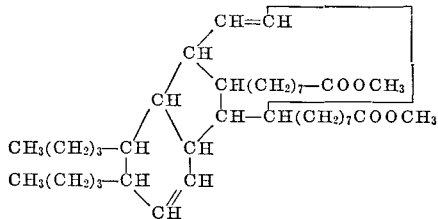

(Industrial and Engineering Chemistry, vol. 34, No. 9, September 1942, pages 1120–3).

Other information obtained is in essential agreement with the above studies. Thus analysis of dimerized acids prepared from linoleic acid rich starting materials using heat alone or heat plus a catalyst, such as an acid or alkaline clay, shows that the product contains structurally similar acids having monocyclic tetrasubstituted cyclohexene ring structures as well as acids with two and three rings, such additional rings generally being fused to the six carbon atom ring. Additionally, the clay catalyzed dimerized acids have been shown to contain some aromatic rings according to ultraviolet and infrared spectroscopy. These aromatic rings are believed to be formed by hydrogen transfer (by catalytic action of clay) from the substituted cyclohexene ring to form a substituted benzene ring. Such acids are believed to comprise less than about 20% by weight of the dimerized fat acid. Polymerization of pure oleic acid using a clay catalyst has been shown to yield a mixture of dimerized fat acids of which approximately 25–30% by weight have a tetrasubstituted cyclohexene ring with the remainder being non-cyclic. However, when mixtures of oleic and linoleic acids (such as from tall oil) are polymerized, the resulting dimerizer fat acid contains little if any dimer having a non-cyclic structure.

It is thus apparent that the polymerization of the ethylenically unsaturated acids yields complex products. The dimer fraction thereof, generally consisting of a mixture of acids, can be assigned the formula:

$$HOOC\text{—}R_3\text{—}COOH$$

where $R_3$ is a divalent hydrocarbon group containing 30 to 42 carbon atoms. It is also apparent that said divalent hydrocarbon group is complex. However, from the noted studies and other information that we have obtained, it can be seen that a mixture of acids normally results from the polymerization and subsequent fractionation and these acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Such dimeric acids may be considered as having a general formula as follows:

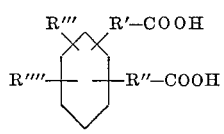

where R' and R'' are divalent hydrocarbon radicals, R''' and R'''' are monovalent hydrocarbon radicals and the sum of the carbon atoms in R'–R'''' is 24–36. The ring contains one double bond. It is also understood that the R'–R'''' radicals may form one or more additional cyclic structures which are generally fused to the first ring. It is further understood that the ring or rings may be saturated such as where the dimer acids are hydrogenated under conditions which convert the unsaturated acids to the corresponding saturated compounds.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of a relatively pure dimer fraction (98.5% dimer) obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, one significant component being

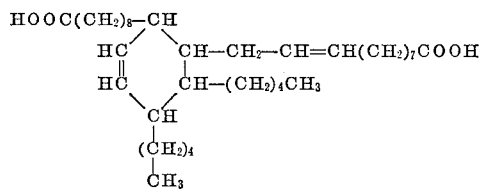

Hydrogenation of such mixture of acids using palladium catalyst yielded the corresponding saturated acids, one significant component thereof being

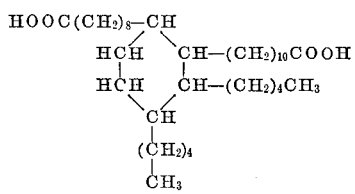

Such mixture of saturated dimerized fat acids was used in the preparation of the dimeryl isocyanates employed in the examples to follow. It is understood that the said diisocyanates may contain small amounts of monoisocyanates derived from the starting monoacids and/or small amounts of polyisocyanates derived from trimerized and higher polymeric fat acids. The total amount of such mono and higher polyisocyanates should be less than about 10%, and preferably less than about 5% by weight.

The derivatives used in the present invention are prepared by simply mixing the ketimine or aldimine blocked alkylene polyamine with the dimeryl isocyanate. Such mixing is carried out in an atmosphere substantially free of moisture. Where desired, the reaction mixture may be heated although the reaction is normally exothermic to a certain extent. The diisocyanate is used in an amount of about one mole for each two moles of the diketimine or dialdimine. The reaction can be illustrated by the following:

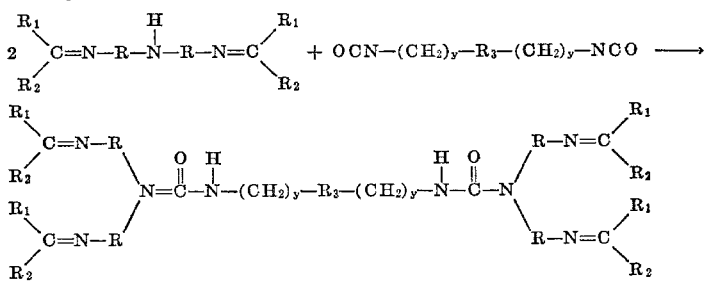

where R, $R_1$, $R_2$, $R_3$ and $y$ are as above defined.

As indicated, the polyurea polymers of the present invention are prepared from the described derivatives and certain polyisocyanates or combinations of polyisocyanates. The polyisocyanates employed have the formula

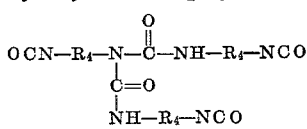

where $R_4$ is a divalent hydrocarbon radical of 2 to 10 carbon atoms which is preferably an alkylene radical such as ethylene, butylene, hexamethylene, octamethylene, and the like. It is especially preferred that $R_4$ is hexamethylene. These triisocyanates are prepared by well-known procedures. See U.S. Patent 3,124,605 and British Patent 1,044,932.

The polyurea polymers are prepared by mixing about equivalent amounts of the described triisocyanates and the derivatives (the equivalents being based on the number of isocyanato groups of the triisocyanate and the aldimine and ketimine groups of the derivative) and exposing the mixture to water—i.e. moisture from the atmosphere. The reaction mixture can be heated or cooled, if desired, to control the rate of reaction. The moisture hydrolyzes and thus converts the aldimine or ketimine groups of the derivative to free primary amine groups which then react with the isocyanato groups of the triisocyanate. It is preferred to expose the reaction mixture to atmospheres containing from about 10 to 90% relative humidity. Of course, the reaction mixture will be exposed to a sufficient amount of moisture to convert substantially all of the aldimine or ketimine groups of the derivative to free primary amine groups. The reaction will normally be substantially complete at ambient temperatures within a relatively short time, such reaction period depending somewhat on the amount of moisture present in the environment—i.e. at higher relative humidities the reaction period will be shorter.

A portion of the triisocyanate can be replaced by the diisocyanate derived from dimerized fat acids as employed in the preparation of the derivative. Thus up to about 75% of the equivalents of the triisocyanate can be replaced by the dimeryl isocyanate.

The reaction can be carried out in the presence of diluents or solvents or mixtures of solvents. In this respect, the derivative can be dissolved in one solvent and the triisocyanate in the same or different solvent and then the two solutions can be mixed and exposed to moisture. Preferably the solvents are volatile. One solvent is methyl ethyl ketone which can be used as the sole solvent for the reaction mixture. Another solvent is mineral spirits which is preferably added to the previously mixed derivative and triisocyanate. Xylene, methyl isobutyl ketone, mixtures of xylene and Cellosolve acetate and aromatic naphthas can also be used. The use of a solvent is particularly advantageous where relatively thin coatings are to be prepared.

Various other known additives can be used such as fillers, pigments and the like.

The following examples illustrate certain preferred embodiments of the invention and are not to be considered as limiting. The derivative used in such examples was prepared from the diketimine made from diethylenetriamine and methyl isobutyl ketone and a dimeryl isocyanate having the structural formula $$OCN-CH_2-R_3-CH_2-NCO$$

where $R_3$ is the dimeric fat acid radical derived from the mixture of saturated dimerized fat acids as above described obtained by the polymerization, fractionation and hydrogenation of tall oil fatty acids. The derivative had the following structural formula:

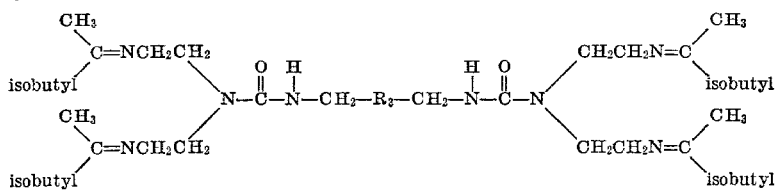

The starting diketimine is commercially available as Epon Curing Agent H-1. The triisocyanate used in the examples is commercially available under the trademark Desmodur N. It has the structural formula:

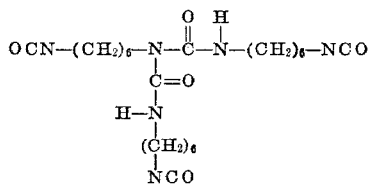

EXAMPLE I

To a solution of 21.9 g. (0.077 eq.) derivative in 19.3 gm. of aromatic naphtha solvent (Amsco Super Hi Flash Solvent BC–100) was added 19 g. of a 75% by weight solution of triisocyanate (0.077 eq.) in a solvent consisting of Cellosolve acetate and xylene (50:50 volume ratio). Coatings were cast from the resulting reaction mixture on various substrates with a 3.0 mil doctor blade and allowed to cure for 14 days at 72–76° F. and 50±8% relative humidity. The coatings became tack free to aluminum foil in 1½ hours. The cured polyurea coatings had the following properties:

Pencil hardness _____ 4B
Sward-Rocker hardness _____ 42
G.E. extensibility (percent) _____ >60
Gardner Reverse impact (in. lb.):
    On cold rolled steel _____ 16–24
    On polished cold rolled steel _____ 60–100
Gloss (60°) (ASTM D–523–62T) _____ 81
Taber abrasion (mgm. wt. loss per 1000 cycles
    using CS–10 wheel) _____ 39.2

The coatings on tinplate had excellent solvent resistance (ASTM D–154–47) to aviation gasoline, Skydrol 500, mineral spirits and synthetic aircraft transmission oil while they were made very soft by water, toluene, 5% acetic acid and 50% ethanol in this severe 24 hour immersion test. The coatings on glass had excellent solvent resistance to 20% NaOH but were rendered very soft by 37%

$$H_2SO_4$$

and were swollen by oleic acid. The coatings were not stained by the synthetic aircraft transmission oil. The coatings showed very good dry adhesion to bonderized steel and tinplate and good adhesion to bonderized aluminum.

EXAMPLES II, III, AND IV

Example I was repeated except that a portion of the triisocyanate was replaced by the dimeryl isocyanate as employed in the preparation of the derivative. The reactants were used in the following proportions:

EXAMPLE II

| Derivative [1] | Dimeryl isocyanate | Triisocyanate [2] |
| --- | --- | --- |
| 20.5 g. (0.072 eq.) | 5.4 g. (0.018 eq.) | 13.3 g. (0.0539 eq.) |
| 29.3 g. (0.0680 eq.) | 10.2 g. (0.034 eq.) | 8.4 g. (0.034 eq.) |
| 18.5 g. (0.0651 eq.) | 14.6 g. (0.0486 eq.) | 4.0 g. (0.0162 eq.) |

[1] The derivative was dissolved in the aromatic naphtha solvent as in Example I, the amount of such solvent in Examples II, III and IV being 20.6, 21.7 and 23.1 gm., respectively. The dimeryl isocyanate and triisocyanate were added to the solutions of the derivative.
[2] Dissolved in Cellosolve acetate and xylene as in Example I.

The cured polyurea coatings had the following properties:

|  | Exp. II | Exp. III | Exp. IV |
| --- | --- | --- | --- |
| Pencil hardness | 4B | 5B | 5B |
| Sward rocker hardness | 38 | 34 | 26 |
| G.E. extensibility (percent) | >60 | >60 | >60 |
| Gardner reverse impact (in. lb.): |  |  |  |
|   On cold rolled steel | 40–60 | 40–60 | 100–120 |
|   On polished cold rolled steel | 100–120 | 120–160 | 140–160 |
| Gloss (60°) (ASTM D–523–62T) | 93 | 95 | 92 |
| Taber abrasion (mgm. wt. loss per 1,000 cycles using CS–10 wheel) | 40.0 | 39.8 | 35.0 |

The solvent resistance of the coatings was as follows:

| Exp. | $H_2O$ | Toluene | Aviation gasoline | Skydrol 500 | 5% acetic acid | 50% ethanol | Mineral spirits | 20% NaOH | 37% $H_2SO_4$ | Oleic acid |
| --- | --- | --- | --- | --- | --- | --- | --- | --- | --- | --- |
| II | 2 | 5 | 4 | 1 | 5 | 5 | 1 | 1 | 5 | 5 |
| III | 2 | 5 | 4 | 1 | 5 | 5 | 3 | 1 | 5 | 5 |
| IV | 2 | 5 | 5 | 1 | 5 | 4 | 4 | 1 | 5 | 5 |

1=no change. 2=very slightly soft. 3=slightly soft. 4=soft. 5=very soft.

The coatings of Examples II and III also had excellent solvent resistance to synthetic aircraft transmission oil while the coating of Example IV was caused to swell very slightly and was stained by such oil. The coatings of Examples II–IV all had very good dry adhesion to tin, bonderized aluminum and bonderized steel. The coating of Example III also had good dry adhesion to cold rolled steel. The coating of Example IV had very good dry adhesion to glass and good dry adhesion to cold rolled steel and aluminum.

It is apparent from the above data that the polyurea polymers of the present invention have high utility as coatings for a variety of substrates. The coating of Example I, in particular, has a unique combination of properties including hardness, flexibility and solvent resistance to make it a very desirable coating for aircraft. The polyurea coatings of Examples II–IV also have a unique combination of properties including an unexpectedly high gloss. In this respect, the gloss of a coating prepared in an identical manner from the derivative and only dimeryl isocyanate had a gloss of 91. The coating of Example I from the triisocyanate alone had a gloss of 81. Yet, the coatings of Examples II, III, and IV prepared from combinations of the triisocyanate and dimeryl isocyanate had glosses of 93, 95 and 92, respectively.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A polyurea polymer prepared by reacting about equivalent amounts of: (1) a derivative of the structural formula:

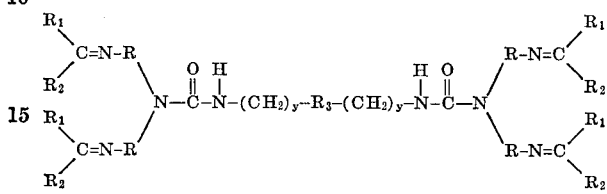

where R is an alkylene radical of 2 to 6 carbon atoms, $R_1$ and $R_2$ are hydrogen or organic radicals with the proviso that one of such radicals must be an organic radical, $R_3$ is the 30 to 42 carbon atom divalent hydrocarbon group of dimerized ethylenically unsaturated aliphatic monobasic carboxylic acids of 16 to 22 carbon atoms, and y is 0 or 1; and (2) a triisocyanate of the structural formula:

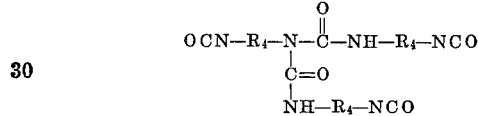

where $R_4$ is a divalent hydrocarbon radical of 2 to 10 carbon atoms; said reaction being carried out by exposing the reaction mixture to moisture in an amount sufficient to convert substantially all of the

groups of the derivative to primary amine groups.

2. The polyurea polymer of claim 1 where R is ethylene, $R_1$ and $R_2$ when organic are alkyl radicals of 1 to 4 carbon atoms and $R_4$ is an alkylene radical.

3. The polyurea polymer of claim 2 where $R_1$ is methyl, $R_2$ is isobutyl, $R_3$ is the 34 carbon atom divalent hydrocarbon radical of dimerized ethylenically unsaturated aliphatic monobasic carboxylic acids of 18 carbon atoms and $R_4$ is hexamethylene.

4. The polyurea polymer of claim 3 where the carboxylic acids are a mixture rich in linoleic acid.

5. The polyurea polymer of claim 4 where $R_3$ is saturated.

6. The polyurea polymer of claim 1 wherein up to about 75% of the equivalent amount of the triisocyanate (2) is replaced by (3) a diisocyanate of the structural formula $$OCN-(CH_2)_y-R_3-(CH_2)_y-NCO$$

7. The polyurea polymer of claim 6 where R is ethylene, $R_1$ is methyl, $R_2$ is isobutyl, $R_3$ is the 34 carbon atom divalent hydrocarbon radical of dimerized ethylenically unsaturated aliphatic monobasic carboxylic acids of 18 carbon atoms and $R_4$ is hexamethylene.

8. The polyurea polymer of claim 7 where $R_3$ is saturated.

9. The polyurea polymer of claim 1 wherein the derivative (1) and triisocyanate (2) are reacted in the presence of a volatile solvent.

10. A substrate coated with the polyurea polymer of claim 1.

11. A substrate coated with the polyurea polymer of claim 5.

12. A substrate coated with the polyurea polymer of claim 6.

References Cited

UNITED STATES PATENTS 3,397,178  8/1968  Shackelford et al. _____ 260—47

FOREIGN PATENTS 1,393,412  12/1965  France.

DONALD E. CZAJA, Primary Examiner

M. J. WELSH, Assistant Examiner

U.S. Cl. X.R.

117—161; 260—33.6

PO-1050
(5/69)

UNITED STATES PATENT OFFICE
CERTIFICATE OF CORRECTION

Patent No. 3,493,543    Dated February 3, 1970

Inventor(s) John R. Nazy, Kenneth B. Stokes

It is certified that error appears in the above-identified patent and that said Letters Patent are hereby corrected as shown below:

Column 2, line 72, that portion of the last line of the formula reading " + 4HC" should read -- + 4HCl --. Column 4, line 13, that portion of the formula reading " -C=-R')" should read -- -C=C-R') --; line 14, "ruring" should read -- during --; lines 22-24, the right-hand portion of the formula reading

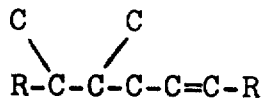    should read    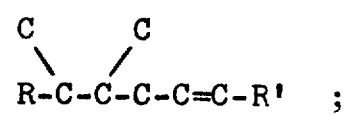

lines 25 and 29, insert -- or --. Column 7, lines 6-14, the left-hand portion of the formula reading

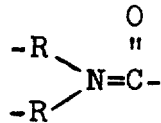    should read    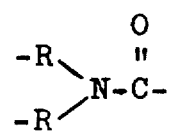

Column 9, line 25, "29.3 g. (0.0680 eq.)" should read -- 19.3 g. (0.0680 eq.) --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents